United States Patent [19]
Olofsson et al.

[11] 3,875,968
[45] Apr. 8, 1975

[54] DEVICE FOR MIXING GASEOUS FLUIDS

[75] Inventors: Sven Olofsson, Jarfalla; Sven Broddner, Upplands Vasby; Leif Bromster, Solna, all of Sweden

[73] Assignee: Junger Instrument AB, Solna, Sweden

[22] Filed: Feb. 1, 1974

[21] Appl. No.: 438,661

[30] Foreign Application Priority Data
Feb. 7, 1973 Sweden............................ 1700/73

[52] U.S. Cl. ............... 137/636.1; 137/607; 251/263
[51] Int. Cl. ........................................... F16k 19/00
[58] Field of Search .......... 137/636.1, 607; 251/263

[56] References Cited
UNITED STATES PATENTS
1,500,694  7/1924  Whidden...................... 137/607 X
3,809,109  5/1974  Breiling.......................... 137/607 X

*Primary Examiner*—Robert G. Nilson

[57] ABSTRACT

A device for mixing at least two gases, in which the feed flow rates of the gases are controlled by means of needle valves and the relative proportions of the two gases in the gas mixture as well as the total flow rate of the gas mixture being delivered from the device can be varied. The variation of the relative proportions of the two gases in the gas mixture is independent and unaffected of the total flow rate of the gas mixture being delivered from the device, and vice versa the variation of the total flow rate of the gas mixture being delivered from the device is independent and unaffected of the relative proportions of the two gases in the gas mixture.

4 Claims, 3 Drawing Figures

DEVICE FOR MIXING GASEOUS FLUIDS

BACKGROUND OF THE INVENTION

1. Field of the Invention

The present invention is related to a device for mixing at least two gaseous fluids and more particularly a device which supplies a variable volume per unit of time of a gas mixture containing two gaseous components in a variable mutual proportion.

2. Description of the Prior Art

In many connections, as for instance in lung ventilators, there is a need for a device for continuous mixing of two gaseous fluids, in which device it is possible to vary the proportion of the two gases in the mixture as well as the total volume of the gas mixture being delivered per unit of time. In connection with lung ventilators it can also occur that during certain periods one wishes to mix a first and a second gas, as for instance nitrous oxide and oxygen, whereas during other periods one wishes to mix a third gas with one of the first mentioned gases, as for instance air with oxygen. Also in this case it must be possible, independent of the gases being mixed at any given moment, to vary the mixing ratio between the two gases being mixed as well as the total volume of the gas mixture being delivered per unit of time.

The handling of such a gas mixing device, for instance in a lung ventilator, is facilitated considerably, if the setting of the mixing ratio on the one hand and the setting of the total flow rate of the delivered gas mixture on the other hand are completely independent of one another so that it is possible to vary the mixing ratio without affecting the total flow rate of the gas mixture being delivered as well as to vary the total flow rate of the gas mixture being delivered without affecting the mixing ratio between the two gases in the mixture.

SUMMARY OF THE INVENTION

The object of the present invention is therefore to provide a device for mixing at least two gaseous fluids, which provides the above mentioned independent variation and preadjustment of on the one hand the mixing ratio between the two gaseous fluids and on the other hand the total flow rate of the gas mixture being delivered.

For this object the invention concerns a device for mixing a first gas and a second gas, comprising first needle valve means for controlling the flow of said first gas and second needle valve means for controlling the flow of said second gas, each of said first and second needle valve means including a valve port and an axially movable valve needle cooperating with said valve port and having such a shape that the flow rate through the valve port is directly proportional to the axial displacement of the valve needle between a completely closed position and a completely open position and an longitudinally movable control rod coupled to said valve needle for displacing said valve needle, and setting means common to said first and second needle valve means, said setting means including a first straight control bar cooperating with the control rod of said first needle valve means as a guide path therefor and a second straight control bar cooperating with the control rod of said second needle valve means as a guide path therefor, each of said second and first control bars being translationally movable in a direction perpendicular to the longitudinal direction of the control rod cooperating with the bar and pivotal about its one end for variation of the angle between the bar and the longitudinal direction of the control rod cooperating therewith, and means coupling said first and second control bars mechanical to each other so that they form the same variable angle with the control rods of their associated needle valve means and are moved translationally at the same time and over equally large distances, one of them in a direction closing the associated needle valve means and the other one in a direction opening its associated needle valve means.

BRIEF DESCRIPTION OF THE DRAWINGS

In the following the invention will be further described with reference to the accompanying drawings, which show by way of example some embodiments of the invention. In the drawings

DESCRIPTION OF PREFERRED EMBODIMENTS

Figure 1:
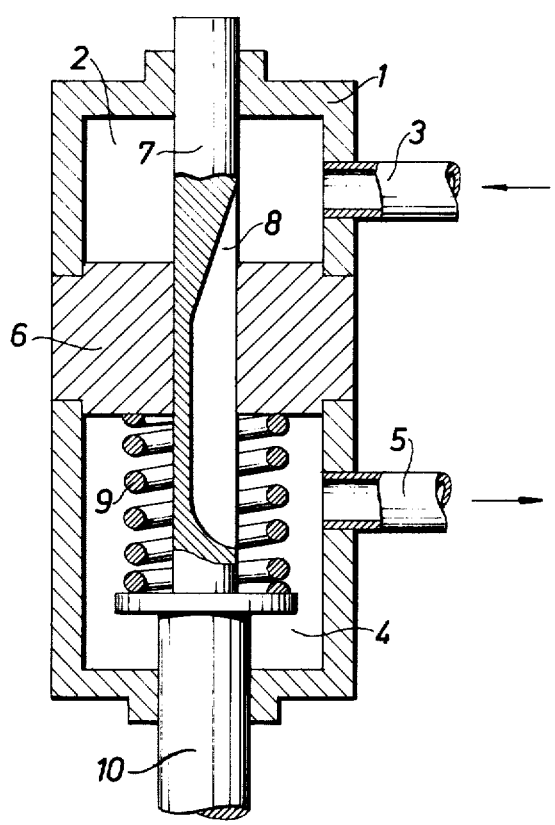
FIG. 1 shows schematically and in axial section the general design of a needle valve, which may be used in a device according to the invention.

A device according to the invention comprises needle valve means for controlling the flow of the gases to be mixed, these needle valves being of such a design that each of them supplies a gas flow having a flow rate directly proportional to the axial displacement of the valve needle between completely closed and completely open positions. Needle valve means with such operating characteristics are known in the art in various designs and in principle any such prior art needle valve may be used in a device according to the invention. For the sake of completeness, FIG. 1 in the drawings shows schematically and in section a possible design of such a needle valve usable in the invention. The needle valve shown in FIG. 1 comprises a valve body 1 with an inlet chamber 2 provided with an inlet port 3 for the gas flow and an outlet chamber 4 provided with an outlet port 5 for the gas flow. The inlet port 3 is assumed to be connected to a source of substantially constant pressure for the gas which is to be supplied at a controlled flow rate, whereas the outlet port 5 is assumed to be connected to a place of use before the gas having a substantially constant counter-pressure, for instance the atmospheric pressure. The partition wall 6 between the inlet chamber 2 and the outlet chamber 4 is provided with a valve aperture or valve port, in which a valve needle 7 is axially displaceable. This valve needle 7 is provided with an axial groove 8 or similar means having such a varying cross-sectional area that the flow rate from the inlet chamber 2 to the outlet chamber 4 through the groove 8 in the valve needle 7 is directly proportional to the axial displacement of the valve needle 7 between the completely closed position and the completely open position for the valve needle. A suitable shape for the groove 8 can be computed theoretically and/or determined empirically and in some cases it may be preferable to provide the valve needle with several axial grooves of different shapes. In the needle valve shown by way of example in FIG. 1 the valve needle 7 is biased towards its completely closed position by a spring 9 and coupled to a control rod 10, which projects from the valve body and by means of which the valve needle 7 can be displaced axially and thus the flow rate through the valve be set on any desired value.

Figure 2:
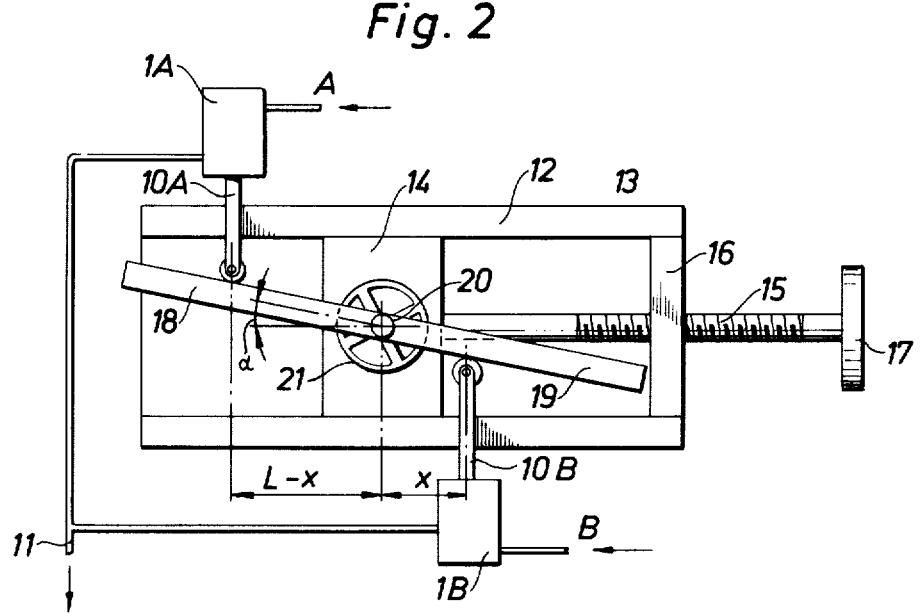
FIG. 2 shows schematically a first embodiment of a device according to the invention for mixing two gases.

The embodiment of a device according to the invention for mixing two gases A and B shown by way of example in FIG. 2 comprises a needle valve 1A, which has the operating characteristics described above and which consequently may for instance be of the type illustrated in FIG. 1, for controlling the feed flow rate of the gas A and a similar second needle valve 1B for controlling the feed flow rate of the gas B. The needle valve 1A is set by means of its associated control rod 10A, whereas the needle valve 1B is set with its associated control rod 10B. For the sake of clearness the two needle valves 1A and 1B are drawn to a disproportionately small scale as compared with other parts of the device. The outlet ports of the two needle valves 1A and 1B are connected to a common outlet conduit 11 so that the flows of the gases A and B are mixed.

A setting device common for both needle valves 1A and 1B is provided for variation of the ratio between the flow rates of the two gas flows A and B, that is the mixing ratio, and the sum of these flow rates, that is the total gas volume being delivered per unit of time. In the embodiment of the invention schematically illustrated in FIG. 2 this setting device comprises a support structure 12, which is stationary relative to the needle valves 1A and 1B and which is provided with a longitudinal guideway 13, along which a carriage or sleigh 14 is movable. The sleigh 14 is moved along the guideway 13 by means of a screw 15 which is rotatable in the sleigh 14 and extends through a corresponding threaded bore in an end wall 16 of the guideway 13. The screw 15 is provided with a knob 17. The sleigh 14 carries two straight bars 18 and 19 serving as guide paths for the control rods 10A and 10B of the needle valves 1A and 1B, respectively. The two bars 18 and 19 are rigidly connected or joined at their adjacent ends so as to be co-linear. The rigidly interconnected bars 18 and 19 are pivoted on the sleigh 14 for rotation about a pivot 20 located in the point of juncture between the bars 18 and 19. A knob 21 is provided for rotating the bars 18 and 19 about said pivot and thus for variation of the inclination, that is the angle $\alpha$, of the bars 18 and 19. The bars 18 and 19 can be locked in their desired inclined position by means of suitable locking means not illustrated in the drawing. The sleigh 14 can be moved by means of the screw 15 between a position with the pivot 20 of the bars 18, 19 located opposite the control rod 10B of the needle valve 1B and a position with the pivot 20 opposite the control rod 10A of the needle valve 1A. It is appreciated that with the bars 18 and 19 set in a position parallel to the direction of movement of the sleigh 14, that is for $\alpha = 0$, the setting of the needle valves 1A and 1B will not be changed when the sleigh 14 is displaced by means of the screw 15. It is assumed that the needle valves 1A and 1B are positioned in such a manner relative to the bars 18 and 19 that they are completely closed, when the bars are in said zero-position, so that no gas flow is produced through the output conduit 11.

It is realized that with the designations used in FIG. 2 one has the relations $$q_A \sim (L - x) \, \mathrm{tg}\alpha \quad (1)$$

$$q_B \sim x \, \mathrm{tg}\alpha \quad (2)$$

where $q_A$ is the flow rate of the gas A and $q_B$ is the flow rate of the gas B. It follows herefrom $$q_A/q_B \sim \frac{L-x}{x} \quad (3)$$

$$q_A + q_B \sim \mathrm{tg}\alpha \quad (4)$$

Consequently, the ratio $q_A/q_B$ between the two gas flows A and B, that is the mixing ratio between the two gases, is determined solely by and proportional to the lateral position of the pivot 20, whereas the total flow rate of the gas mixture $q_A + q_B$ is determined solely by and proportional to the angle $\alpha$. Consequently, the mixing ratio between the two gases A and B can be varied by lateral displacement of the sleigh 14 by means of the screw 15 without any influence on the total flow rate of the gas mixture, whereas this total flow rate of the gas mixture can be varied by rotation of the bars 18 and 19 about the pivot 20 wihtout any influence upon the mixing ratio between the gases.

Figure 3:
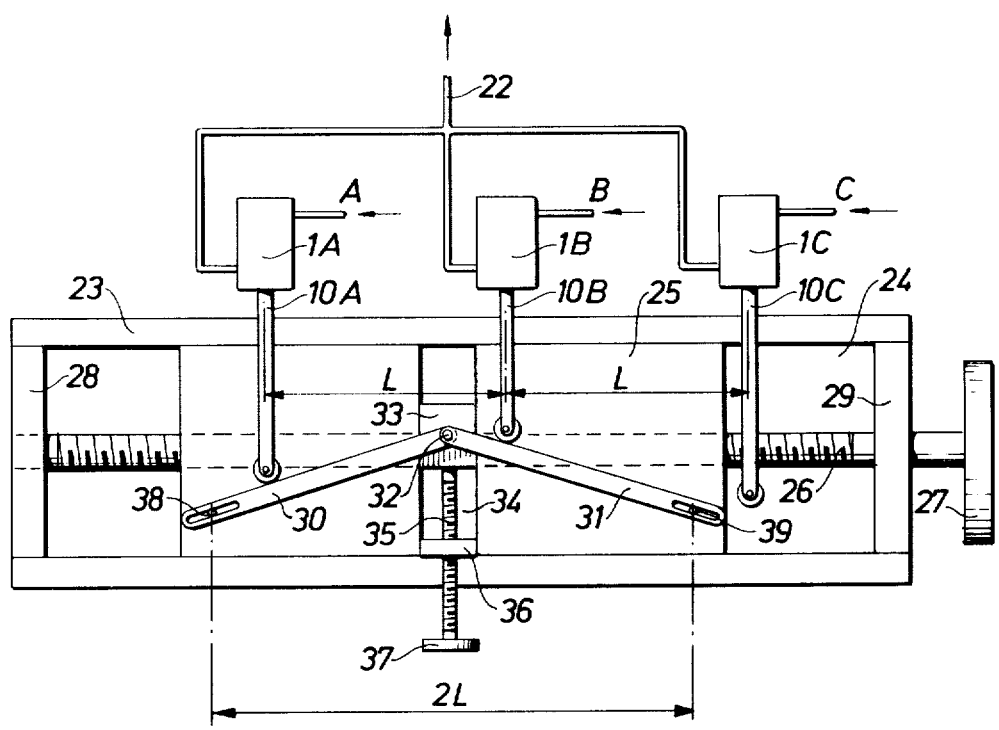
FIG. 3 shows schematically another embodiment of a device according to the invention for mixing alternatively a first and a second gas with each other or a third gas with one of said first and second gases.

The device according to the invention shown schematically and by way of example in FIG. 3 for mixing alternatively two gases A and B or the gas B with a third gas C comprises a needle valve 1A, 1B and 1C, respectively, of the kind mentioned in the foregoing for each of the gases A, B and C, respectively. These needle valves are provided with associated control rods 10A, 10B and 10C, respectively, for the setting of the needle valves and have their outlets connected to a common outlet conduit 22 for the gas mixture.

The control means for determining the two gases presently to be mixed, the gases A and B or the gases B and C, and for variation of the mixing ratio of the gases presently being mixed and the total flow rate of the gas mixture presently being delivered comprise a support structure 23 which is stationary relative to the needle valves 1A, 1B, 1C and which is provided with a guideway 24 for a carriage or sleigh 25 which can be moved along the guideway by means of a screw 26 provided with a knob 27. The screw 26 is rotatable in end walls 28 and 29 of the guideway 24 and extends through a threaded bore in the sleigh 25.

The sleigh 25 supports two straight bars 30 and 31, which have one end each pivoted about a common pivot pin 32 which is attached to a second sleigh or carriage 33 which is movable in a guideway 34 in the sleigh 25 perpendicularly to the direction of movement of the sleigh 25. The sleigh 33 can be moved in its guideway 34 by means of a screw 35 which is rotated in the sleigh 33 and extends through a threaded bore in an end wall 36 of the guideway 34. The screw 35 is provided with a knob 37. The bars 30 and 31 are of equal length and their opposite ends are pivoted about pins 38 and 39, respectively, which are mounted on the sleigh 25 so that the junction line between the pins 38 and 39 is parallel to the direction of movement of the sleigh 25. The lateral spacing between the control rods 10A and 10B for the needle valves 1A and 1B, respectively, is equal to the lateral spacing between the control rods 10B and 10C for the needle valves 1B and 1C, respectively, and half as large as the lateral spacing between the pivot pins 38 and 39 for the bars 30 and 31, respectively.

By means of the screw 26 the sleigh 25 can be moved in its guideway 24 between one end position, in which the common pivot axis 32 of the bars 30,31 is opposite to the control rod 10A of the needle valve 1A, and an opposite end position, in which the common pivot axis 32 of the bars is opposite to the control rod 10C of the needle valve 1C. Further, it is assumed that, if the two bars 30 and 31 are pivoted so as to be coextensive or co-linear to each other and consequently parallel to the direction of movement of the sleigh 25, the needle valves having their control rods cooperating with the bars 30 and 31 are completely closed. This is also true for the needle valve the control rod of which is presently not affected by any one of the bars 30 and 31.

From the foregoing and the preceding description of the operation of the device illustrated in FIG. 2 it is appreciated that the gas mixture delivered through the output conduit 22 of the device illustrated in FIG. 3 will be a mixture of the two gases A and B, if the sleigh 25 is in such a position that the control rod 10A of the needle valve 1A cooperates with the bar 30 and the control rod 10B of the needle valve 1B cooperates with the bar 31. The mixing ratio between the two gases is then determined by the position of the sleigh 25 in the guideway 24, which position can be varied by means of the knob 27 and the screw 26, whereas the total flow rate of the gas mixture is determined by the position of the sleigh 33 in the guideway 34, which position can be varied by means of the knob 37 and the screw 36. If the sleigh 25 is moved in the guideway 24 so far to the right from the position shown in FIG. 3 that the common pivot axis 32 of the bars 30 and 31 is moved past the control rod 10B of the needle valve 1B, whereby the control rod 10B of the needle valve 1B will cooperate with the bar 30 whereas the control rod 10C of the needle valve 1C will cooperate with the bar 31, the gas mixture delivered through the outlet conduit 22 will instead consist of the two gases B and C. Also in this case the mixing ratio between the two gases B and C is determined by the position of the sleigh 25 in the guideway 24, whereas the total flow rate of the gas mixture is determined by the position of the sleigh 33 in its guideway 34.

It is appreciated that an arrangement of setting and control means of the type illustrated in FIG. 3 can also be used in a device for mixing only two gases and thus comprising only two needle valves.

It is also appreciated that the mixture of two gases, for instance the gases A and B, obtained from a mixing device according to the invention, for instance of the design illustrated in FIG. 2 or FIG. 3, can be mixed with an additional gas, for instance called D, the flow rate of which is controlled by means of a needle valve of the type described in the foregoing. If in this case the needle valve for the additional gas D is set or controlled by means of a straight control bar, which is coupled to the control bars for the needle valves for the gases A and B so as to have always the same angle of inclination as the control bars for the gases A and B, but which is translationally movable relative to the needle valve of the gas D separately and independent of the translational displacement of the control bars for the gases A and B, the gas D will be mixed with the gas mixture A + B in a proportion determined by the translational position of the control bar for the needle valve for the gas D but independent and unaffected of the mixing ratio between the gases A and B as well as the total flow rate of the gas mixture A + B.

It is also appreciated that several other embodiments of a device according to the invention are possible in addition to the embodiments described in the foregoing. Thus, the mechanical setting means for the control bars cooperating with the needle valves may of course be designed in several other ways. Also the coupling between the control bars and the control rods of the needle valves can be designed in several other ways. Thus, for instance, the control bars can be provided with straight guide grooves in which rolls mounted on the control rods of the needle valve run.

What we claim is:

1. A device for mixing a first gas and a second gas, comprising first needle valve means for controlling the feed flow rate of said first gas and second needle valve means for controlling the feed flow rate of said second gas, each of said first and second needle valve means including a valve port and an axially movable valve needle cooperating with said valve port and having such a shape that the flow rate through the valve port is directly proportional to the axial displacement of the valve needle between a completely closed position and a completely open position and a longitudinally displaceable control rod coupled to said valve needle for axially displacing the same; and setting means common to said first and second valve needle means, said setting means including a first straight control bar cooperating with the control rod of said first needle valve means as a guide path therefor and a second straight control bar cooperating with the control rod of said second needle valve means as a guide path therefor, each of said first and second control bars being translationally movable in a direction perpendicular to the longitudinal direction of the cooperating control rod and pivotal about its one end for variation of the angle between the control bar and its cooperating control rod, and coupling means mechanically coupling said first and second control bars to one another in such a way that said first and second control bars form the same variable angle with the longitudinal direction of their associated control rods and are moved translationally simultaneously and over equal distances, one of them in a direction closing the associated needle valve means and the other one in a direction opening the associated needle valve means.

2. A device as claimed in claim 1, wherein said first and second control bars are co-linear and rigidly joined to one another at their adjacent ends and pivotal as a unit about a pivot axis through their point of junction, said first and second needle valve means being disposed with their control rods mutually parallel and cooperating with said first bar and said second bar, respectively, on opposite sides of said pivot axis.

3. A device as claimed in claim 1, wherein said first and second bars are of equal length and mounted on a linearly movable support with one end each pivoted about a common pivot axis displaceable relative to said support in a direction perpendicular to the direction of movement of said support and their opposite ends pivoted about a second and a third pivot axis, respectively, which are stationary relative to said support and spaced apart so that the junction line between them is parallel to the direction of movement of said support, said first and second needle valve means being disposed with their control rods mutually parallel and cooperating with said first and second bar, respectively.

4. A device as claimed in claim 3 for mixing alternatively said first gas and said second gas or said second gas and a third gas, comprising third needle valve means of the same kind as said first and second needle valve means for controlling the feed flow rate of said third gas, said third needle valve means being disposed with its control rod parallel to the control rods of said first and second needle valve means on the opposite side of and equally spaced from the control rod of said second needle valve means with respect to the control rod of said first needle valve means, the lateral spacing between the control rods of said first and third needle valve means corresponding substantially to the spacing between said second and third pivot axis for said first and second bars and said movable support being displaceable over such a distance that the control rod of said second needle valve means can cooperate with alternatively said first bar or said second bar.

* * * * *